United States Patent
Shelar et al.

(10) Patent No.: US 9,553,807 B2
(45) Date of Patent: Jan. 24, 2017

(54) BATCH PROCESSING OF PACKETS

(71) Applicant: Nicira, Inc., Palo Alto, CA (US)

(72) Inventors: Pravin Shelar, Sunnyvale, CA (US);
Jesse E. Gross, IV, San Francisco, CA (US); Jarno Rajahalme, Belmont, CA (US)

(73) Assignee: NICIRA, INC., Palo Alto, CA (US)

( * ) Notice: Subject to any disclaimer, the term of this patent is extended or adjusted under 35 U.S.C. 154(b) by 47 days.

(21) Appl. No.: 14/583,065

(22) Filed: Dec. 24, 2014

(65) Prior Publication Data

US 2016/0191384 A1    Jun. 30, 2016

(51) Int. Cl.
*H04L 12/747*    (2013.01)
*H04L 29/06*    (2006.01)

(52) U.S. Cl.
CPC ........... *H04L 45/742* (2013.01); *H04L 69/22* (2013.01)

(58) Field of Classification Search
CPC ............................ H04L 45/742; H04L 69/22
USPC ......................................................... 370/392
See application file for complete search history.

(56) References Cited

U.S. PATENT DOCUMENTS

| | | | |
|---|---|---|---|
| 8,588,189 B2* | 11/2013 | Lee ................. | H04L 5/0007 370/329 |
| 2009/0052552 A1* | 2/2009 | Gutman ............ | H04N 21/2356 375/240.26 |
| 2010/0071024 A1* | 3/2010 | Eyada ................ | H04L 63/0263 726/1 |
| 2015/0012663 A1* | 1/2015 | Mandar .............. | H04L 47/125 709/233 |
| 2015/0095965 A1* | 4/2015 | Yang .................. | H04L 1/0057 725/116 |
| 2015/0365323 A1* | 12/2015 | Duminuco .......... | H04L 45/745 370/235 |

* cited by examiner

*Primary Examiner* — Ronald B Abelson
(74) *Attorney, Agent, or Firm* — Adeli LLP

(57) ABSTRACT

Some embodiments provide a method for a managed forwarding element. The method receives a set of packets for processing by the managed forwarding element. For each of several packets in the set, the method associates the packet with one of several groups of other packets in the set. Each group of packets shares a set of characteristics. For each group of packets the method identifies a set of actions to perform and executes the specified set of actions on all of the packets in the group together.

22 Claims, 12 Drawing Sheets

BATCH PROCESSING OF PACKETS

BACKGROUND

A software virtual switch operating on a host in a datacenter will often have dozens of VMs directly connected, resulting in the virtual switch seeing thousands or even millions of packets per second. One of the main challenges in developing such a software switching element is performance. A hardware switch has application-specific integrated circuits (ASICs) that are specifically designed to support in-hardware forwarding. Software switches, on the other hand, operate on standard machines, such as x86 boxes, and are therefore executed by general-purpose processing units (e.g., CPUs), which are more versatile but slower than the operation-specific circuits. Thus, methods for increasing the performance of the software switching element are needed.

BRIEF SUMMARY

Some embodiments provide a forwarding element that processes packets in batches and executes actions on groups of packets that belong to the same data flow together. The forwarding element receives a batch of packets to process together. During the processing of the packets in the batch, the forwarding element identifies packets that belong to the same data flow (or share a different, broader set of characteristics used to identify actions to perform on the packet). In general, the forwarding element will perform the same set of actions on all packets in the same data flow or group of similar data flows. As such, the forwarding element executes the action specified for the data flow or group of data flows on all of the packets in that data flow or group of data flows together (i.e., after determining the packets in the batch that belong to that data flow or group of data flows).

In some embodiments, the forwarding element is a software managed forwarding element that receives packet processing instructions from a controller (e.g., flow entries, or data tuples that can be converted into flow entries) and uses the flow entries to perform the packet processing. The flow entries, in some embodiments, specify match conditions and one or more actions to perform on a packet when the packet matches those conditions. The flow entries may be arranged in a pipeline of staged lookup tables, and a packet is resubmitted to the next stage after the forwarding element performs on the packet the actions specified by the highest-priority match for the previous stage. Some embodiments generate a cached flow entry, based on the processing of a packet through the staged lookup tables, that specifies a set of packet data (e.g., a connection 5-tuple, a set of packet headers that are used during the lookup tables and affect the outcome of the packet processing, etc.) for packets to match. Each of the cached flow entries also specifies an entire set of actions for the forwarding element to execute on packets that match the cached flow entry.

In addition to the cached flow entries, some embodiments generate an exact-match cache of entries that reference the cached flow entries. Each exact-match cache entry, in some embodiments, is matched by packets belonging to a specific data flow (using, e.g., a flow key of packet headers extracted from the packet that uniquely identifies a connection). In some embodiments, the exact-match cache entries includes the match conditions (e.g., the flow key) and a reference to one of the cached flow entries. As such, multiple different exact-match entries might refer to the same cached flow entry (e.g., for similar data flows for the packets of which the forwarding element will perform the same action).

Some embodiments use the cached flow entries as the basis for grouping the packets in a batch by their particular data flow. That is, all packets in a batch that match an exact-match entry referring to a particular one of the cached flow entries will receive the same treatment by the managed forwarding element. As such, the managed forwarding element identifies the different groups of packets in a batch that share a particular set of characteristics that matches one or more of the exact-match entries referring to the cached flow entry, and only after performing this processing on the packets does the managed forwarding element execute the actions specified for the packets. For example, the forwarding element of some embodiments executes a first set of actions on all of the packets in a batch belonging to a first set of data flows matching a first flow entry, then executes a second set of actions on all of the packets in the batch belonging to a second set of data flows matching a second flow entry. This saves computational resources over executing the actions for each packet individually (e.g., by saving on I/O transactions with the NIC).

In order to keep track of the groups for a batch of packets, some embodiments store a list of packets for each group of packets in a data structure (e.g., an array), with references to the cached flow entries that specify the actions for the flow. When a first packet in the batch matches an exact-match cache entry, the forwarding element of some embodiments creates a new list (e.g., array) based on the match. Some embodiments store a reference to the cached flow entry for the list (e.g., using the reference in the exact-match entry), and each entry in the list identifies a reference to a packet that matches the cached flow entry (based on the packet having matched an exact-match entry). Packets that do not match one of the exact-match entries are sent to the flow lookup process and executed separately in some embodiments.

Some embodiments limit the number of groups with active lists. For instance, some embodiments allow four groups of packets that each reference a different cached flow entry. When a fifth group is identified within a batch, some embodiments execute the action for all of the packets in one of the existing groups (e.g., the first group identified, the group which has gone the longest without gaining an additional packet, etc.) and create a new list for the new group.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it should be understood that that the invention is not limited to the embodiments set forth and that the invention may be practiced without some of the specific details and examples discussed.

Some embodiments provide a forwarding element that processes packets in batches and executes actions on groups of packets that belong to the same data flow together. The forwarding element receives a batch of packets to process together. During the processing of the packets in the batch, the forwarding element identifies packets that belong to the same data flow (or share a different, broader set of characteristics used to identify actions to perform on the packet). In general, the forwarding element will perform the same set of actions on all packets in the same data flow or group of similar data flows. As such, the forwarding element executes the action specified for the data flow or group of data flows on all of the packets in that data flow or group of data flows together (i.e., after determining the packets in the batch that belong to that data flow or group of data flows).

Figure 1:
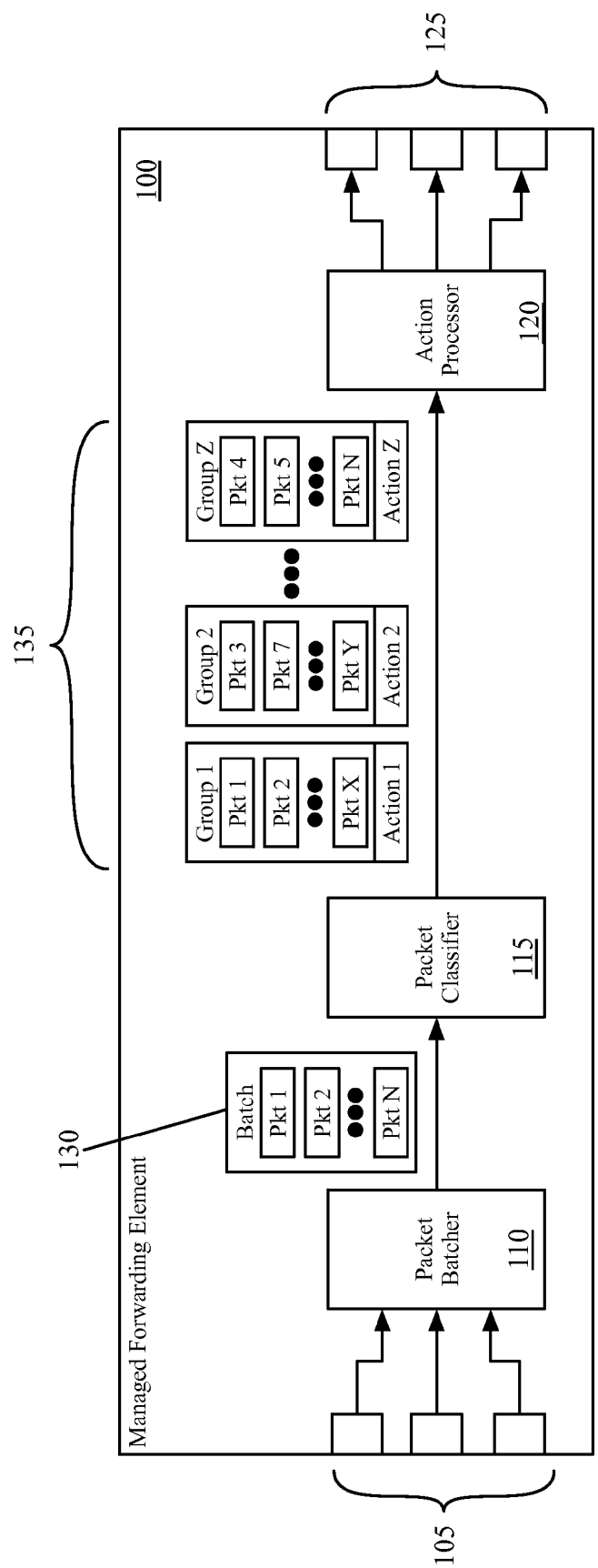
FIG. 1 conceptually illustrates a forwarding element that processes packets in batches and executes actions on groups of packets.

FIG. 1 conceptually illustrates such a forwarding element 100. Specifically, the forwarding element 100 is a software managed forwarding element (MFE) that receives packet processing instructions (e.g., flow entries, or data tuples that can be converted into flow entries) from a controller (not shown) and uses the flow entries to perform the packet processing. As shown, the MFE 100 includes a set of ingress ports 105, a packet batcher 110, a packet classifier 115, an action processor 120, and a set of egress ports 125.

The MFE 100 receives packets through the ingress ports 105. These ingress ports 105 may be ports connected to physical NICs, software port abstractions through which packets are received from virtual machines or other data compute nodes operating on the same physical machine as the MFE 100, software port abstractions that connect to middleboxes operating on the machine with the MFE 100, etc.

The packet batcher 110 of some embodiments acts as a buffer for the packets received through the ingress ports 105 and releases the packets in batches to the packet classifier 115. In some cases, the MFE 100 may process on the order of hundreds of thousands, or even millions, of packets per second. The packets may be released to the classifier 115 in batches of significantly less than that. For instance, some embodiments use batches of 64 packets at a time (based on limitations of the Linux software library Data Plane Development Kit (dpdk)), while other embodiments may use different numbers of packets in a batch.

The packet classifier 115 of some embodiments uses a set of flow entries to determine a set of actions to perform on each packet. As described below by reference to FIG. 2, the packet classifier 115 of some embodiments actually includes both an exact-match cache (for identifying packets within a batch that belong to a specific, previously-seen data flow and can be grouped together) and a classification engine (for performing typical packet processing on packets that do not match an exact-match cache entry).

The flow entries, in some embodiments, specify match conditions and one or more actions to perform on a packet when the packet matches those conditions. The flow entries may be arranged in a pipeline of staged lookup tables, and a packet is resubmitted to the next stage after the forwarding element performs on the packet the actions specified by the highest-priority match for the previous stage. Some embodiments generate a cached flow entry, based on the processing of a packet through the staged lookup tables, that specifies a set of packet data (e.g., a connection 5-tuple, a set of packet headers that are used during the lookup tables and affect the outcome of the packet processing, etc.) for packets to match. Each of the cached flow entries also specifies an entire set of actions for the forwarding element to execute on packets that match the cached flow entry.

In addition to the cached flow entries, some embodiments generate an exact-match cache of entries that reference the cached flow entries. Each exact-match cache entry, in some embodiments, is matched by packets belonging to a specific data flow (using, e.g., a flow key of packet headers extracted from the packet that uniquely identifies a connection). In some embodiments, the exact-match cache entries includes the match conditions (e.g., the flow key) and a reference to one of the cached flow entries. As such, multiple different exact-match entries might refer to the same cached flow entry (e.g., for similar data flows for the packets of which the forwarding element will perform the same action).

Some embodiments use the cached flow entries as the basis for grouping the packets in a batch by their particular data flow. That is, all packets in a batch that match an exact-match entry referring to a particular one of the cached flow entries will receive the same treatment by the MFE 100. As such, the packet classifier 115 identifies the different groups of packets in a batch that share a particular set of characteristics that matches one or more of the exact-match entries referring to the cached flow entry, and only after performing this processing on the packets does the action processor 120 execute the actions specified for the packets.

The action processor 120 executes the actions specified for a particular packet or group of packets. These actions may include performing packet header modification operations (e.g., modifying the source and destination MAC addresses to route the packet), dropping the packet, encapsulating the packet in a tunnel, sending the packet out a particular egress port, etc. When the packets are grouped by the packet classifier 115, the action processor 120 of some embodiments executes a first set of actions on all of the packets in a batch belonging to a first set of data flows matching a first flow entry, then executes a second set of actions on all of the packets in the batch belonging to a second set of data flows matching a second flow entry. This saves computational resources over executing the actions for each packet individually (e.g., by saving on I/O transactions with the NIC).

The operation of the MFE 100 of some embodiments to process a batch of packets will now be described. The MFE receives numerous packets through its ingress ports 105, which are process initially by the packet batcher 110. The packet batcher 110 sends a batch of N (e.g., 64, 128, etc.) packets 130 to the packet classifier 115 for processing.

The packet classifier 115 of some embodiments groups the packets and specifies an action for each of the groups. In order to keep track of the groups for a batch of packets, some embodiments store a list of packets for each group of packets in a data structure (e.g., an array), with references to the cached flow entries that specify the actions for the flow. When a first packet in the batch matches an exact-match cache entry, the packet classifier 115 of some embodiments creates a new list (e.g., array) based on the match. The packet classifier 115 of some embodiments stores a reference to the cached flow entry for the list (e.g., using the reference in the exact-match entry), and each entry in the list identifies a reference to a packet that matches the cached flow entry (based on the packet having matched an exact-match entry). Packets that do not match one of the exact-match entries are sent to the flow lookup process and executed separately in some embodiments. FIG. 1 shows the output of the packet classifier 115 with the N packets grouped into Z groups 135, with an action (or set of actions) specified for each of these groups (in this case, assuming that exact-match entries existed for all of the packets in the group).

The action processor 120 receives one of the groups 135 of packets at a time, and processes all of the packets together (by executing the same specified set of actions for each packet in the group with a single function call that passes the array of packets). The packets in a particular group (if not dropped) are then output through one of the egress ports 125.

Some embodiments limit the number of groups with active lists. For instance, some embodiments allow four groups of packets that each reference a different cached flow entry. When a fifth group is identified within a batch, some embodiments send one of the existing groups (e.g., the first group identified, the group which has gone the longest without gaining an additional packet, etc.) to the action processor 120, which executes the action for all of the packets in that group, while the classifier 115 creates a new list for the new group.

The above description introduces the packet grouping of some embodiments for a managed forwarding element. Several more detailed embodiments are described below. First, Section I introduces the architecture of a managed forwarding element of some embodiments. Section II describes the batch packet processing of some embodiments. Finally, Section III describes an electronic system with which some embodiments of the invention are implemented.

I. Managed Forwarding Element Architecture

In some embodiments, as indicated above, the packet processing operations (e.g., classification operations, forwarding actions, etc.) are performed by a managed forwarding element (MFE) that operates as a software forwarding element. Open vSwitch (OVS) is an example of a flow entry-based software forwarding element. In some embodiments, MFEs operate on host machines that host virtual machines or other data compute nodes that serve as the sources and destinations for packets (e.g., in the virtualization software of such a host machine). For example, a MFE might operate on a host machine that hosts virtual machines for several different logical networks, and would implement the different logical networks for each of the virtual machines residing on the host.

Figure 2:
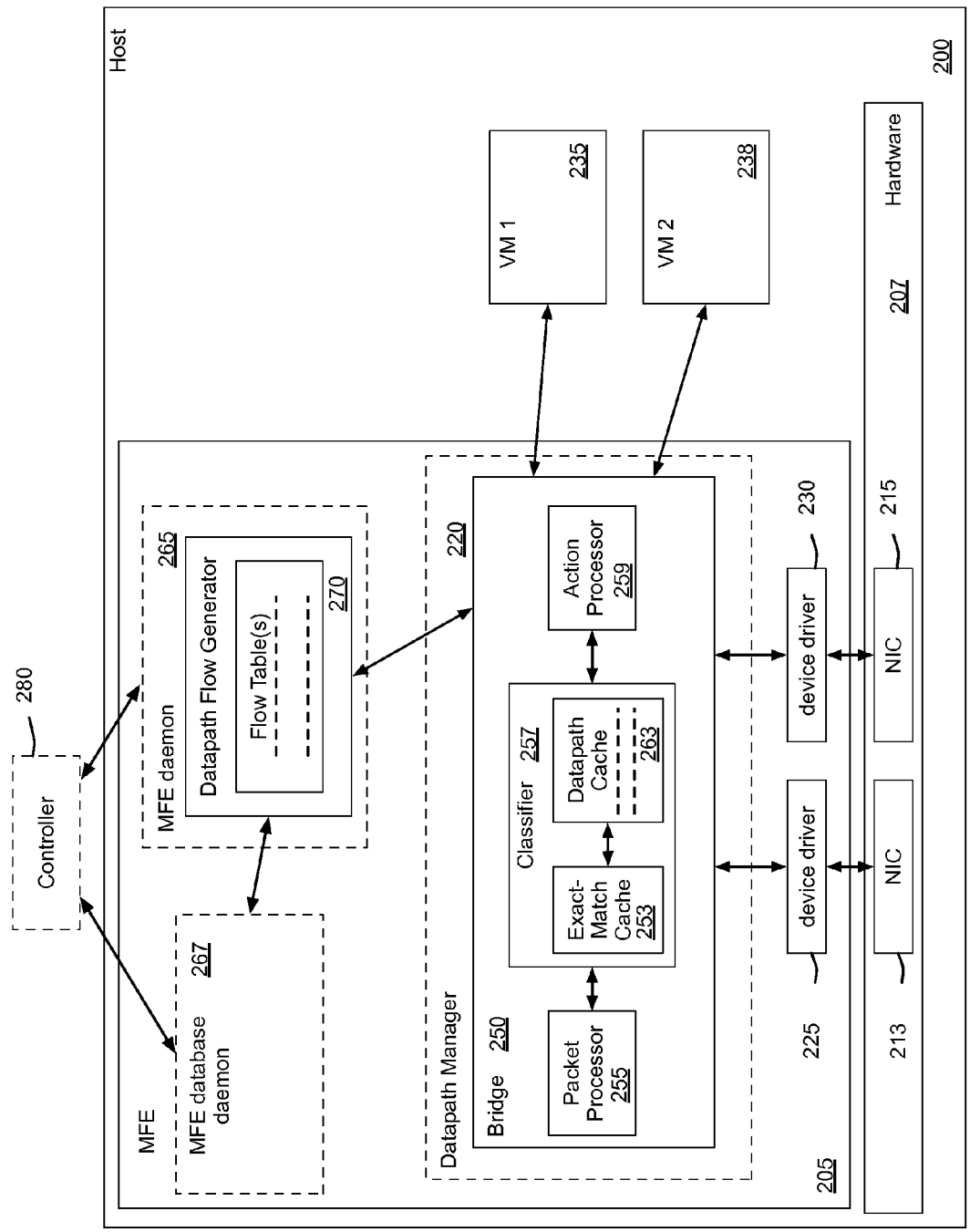
FIG. 2 conceptually illustrates an architectural diagram of a host machine on which a software-implemented MFE of some embodiments is implemented.

FIG. 2 conceptually illustrates an architectural diagram of a host machine 200 on which a software-implemented MFE 205 of some embodiments is implemented. In some embodiments, the MFE is implemented in the virtualization software (e.g., in the hypervisor) of the host 200. In this example, the MFE includes several components, including a datapath manager 220 as well as a MFE daemon 265 and MFE database daemon 267. In some embodiments, the datapath manager 220 operates in a kernel of the virtualization software while the MFE daemon 265 and the MFE database daemon 267 both operate in the user space of the virtualization software.

As shown in FIG. 2, the host 200 includes hardware 207 (though this is a software architecture diagram, the hardware 207 is displayed in order to represent the NICs 213 and 215 of the host machine), virtualization software kernel 205, virtualization software user space 210, and two VMs 235 and 238. The hardware 207 may include typical computer hardware (e.g., processing units, volatile memory (e.g., RAM), nonvolatile memory (e.g., hard disk, optical disks, solid-state memory, etc.), network adapters, etc. As shown, the hardware 207 also includes network interface controllers (NICs) 213 and 215 for connecting a computing device to a network.

The virtualization software is a software abstraction layer that operates on top of the hardware 207 and below any operating system in some embodiments. In some embodiments, the kernel of the virtualization software performs virtualization functionalities (e.g., to virtualize the hardware 207 for several virtual machines operating on the host machine). The kernel handles various management tasks, such as memory management, processor scheduling, or any other operations for controlling the execution of the VMs 235 and 238 operating on the host machine.

As shown, the virtualization software includes device drivers 225 and 230 for the NICs 213 and 215, respectively. The device drivers 225 and 230 allow an operating system to interact with the hardware of the host 200. The VMs 235 and 238 are independent virtual machines operating on the host 200, and may run any number of different operating systems (e.g., Linux, Solaris, FreeBSD, or any other type of UNIX based operating system, Windows-based operating systems, etc.).

The virtualization software also includes the MFE daemon 265 and the MFE database daemon 267, as well as a set of service modules 240. The MFE daemon 265 is an application that runs in the background of the virtualization software. The MFE daemon 265 of some embodiments receives configuration data from the network controller 280 (which may be a chassis controller operating on the host 200, or a network controller operating on a separate physical machine to manage several host machines) and the MFE database daemon 267. For instance, from the controller, the MFE daemon 265 of some embodiments receives generated flow entries that specify packet processing operations to apply to packets when the packets match a set of conditions. The MFE daemon 265 stores the received flow entries in the flow tables 275. In some embodiments, the flow tables are organized in stages (e.g., stages of packet processing), with one or more stages for each of several logical forwarding elements. For instance, a logical switch might have an ingress mapping stage, an ingress ACL stage, a logical forwarding stage, an egress ACL stage, etc.). For a MFE implementing multiple logical networks, each of the logical networks has several stages of flow tables in some embodiments.

In some embodiments, the MFE daemon 265 communicates with the network controller 280 using the OpenFlow Protocol, while the MFE database daemon 267 communicates with the network controller 265 through a database communication protocol (e.g., OVSDB protocol). The database protocol of some embodiments is a JavaScript Object Notation (JSON) remote procedure call (RPC) based protocol.

The MFE database daemon 267 is also an application that runs in the background of the user space 210 in some embodiments. The MFE database daemon 267 of some embodiments communicates with the network controller 280 in order to configure certain aspects of the MFE (e.g., of the MFE daemon 265 and/or the kernel module 220) other than the installation of flow entries. For instance, the MFE database daemon 267 receives management information from the network controller 280 for configuring bridges, ingress ports, egress ports, QoS configurations for ports, etc., and stores the information in a set of databases that help define the configuration of the MFE.

As illustrated in FIG. 2, the MFE 205 includes the datapath manager 220. datapath manager 220 processes and forwards network data (e.g., packets) between VMs and other data compute nodes running on the host 200 and network hosts external to the host (e.g., network data received through the NICs 213 and 215). In some embodiments, the VMs 235 and 238 running on the host 200 couple to the datapath manager through a bridge 250.

In some embodiments, the bridge 250 manages a set of rules (e.g., flow entries) that specify operations for processing and forwarding packets. The bridge 250 communicates with the MFE daemon 265 in order to process and forward packets that the bridge 250 receives. In the example of FIG. 2, the bridge 250 includes a packet processor 255, a classifier 257, and an action processor 259.

The packet processor 255 receives a packet and parses the packet to strip header values. The packet processor 255 can perform a number of different operations. For instance, in some embodiments, the packet processor 255 is a network stack that is associated with various network layers to differently process different types of data that it receives. Irrespective of all the different operations that it can perform, the packet processor 255 passes the header values to the classifier 257. In some embodiments, the packet processor stores these header values in one or more registers that are stored for a packet. In some embodiments, the packet processor 255 defines an object for the packet that includes the registers. The packet object is then used to represent the packet in the MFE. In some embodiments, the packet processor 255 performs the batching functionality for sending a particular number of packets to the classifier at a time. That is, the packet processor 255 receives the packets as they come in, and releases the packets in batches (e.g., of 64 packets) to the classifier 257. In other embodiments, a different module (in the virtualization software or elsewhere) releases batches of packets to the packet processor 255.

The classifier 257 accesses one or more datapath caches 263 (also referred to as a flow cache) to find matching flow entries for different packets. For instance, in some embodiments, the datapath cache 263 is a flow aggregate cache that contains flow entries, each of which is matched by packets falling into a particular traffic aggregate class. That is, each of the flow entries in the aggregate cache specifies a subset of the packet header values for which it requires a match, with the other packet header fields being wildcarded (i.e., a packet can match the flow entry while having any values for the wildcarded fields). In some embodiments, each of the flow entries in the datapath cache 263 specifies an action for the action processor 259 to perform on packets that match the flow entries. These datapath cache flow entries are installed by the classifier 257, in some embodiments, based on processing of a packet through the set of flow tables 275 by the MFE daemon 265

The classifier 257 also includes an exact-match cache 253. The exact-match cache 253 of some embodiments includes entries that are matched by packets belonging to specific data flows (using, e.g., a flow key of packet headers extracted from the packet that uniquely identifies a connection). In some embodiments, an exact-match cache entry includes the match conditions (e.g., the flow key) and a reference to one of the flow entries in the datapath cache 263. As such, multiple different exact-match entries might refer to the same cached flow entry (e.g., for similar data flows for the packets of which the forwarding element will perform the same action).

When the classifier 257 receives the header values for a packet, it first performs a check with the exact-match cache 253 to determine whether the packet belongs to a data flow that already has an entry in the cache 253. In some embodiments, to perform this check, the classifier 257 uses a hash for the packet (e.g., a RSS hash for the packet generated by the NIC 213 or 215 and passed to the datapath with the packet) to see whether the hash matches that of an exact-match cache entry. If such a match is found, the classifier 257 checks the flow key (i.e., the packet headers) against those of the exact-match entry to ensure that the match is not the result of a hash collision.

If a match is found in the exact-match cache, the classifier adds the packet (or a reference to the packet) as an entry in a list of packets (e.g., an array) that correspond to a particular flow entry (i.e., a flow entry in the datapath cache). As mentioned, each exact-match cache entry of some embodiments stores a reference to an aggregate cache flow entry. The arrays of packets, in some embodiments, are organized by such references, so when a packet matches an exact-match entry that references a particular flow entry, the classifier adds the packet to the list referencing the same flow entry.

When the packet does not belong to a data flow for which the exact-match cache already stores an entry, the classifier 257 performs a lookup on the datapath cache 263 (e.g., the aggregate flow cache) to find a matching flow entry. When a matching flow entry is found in the datapath cache 263, the classifier 257 stores a new exact-match cache entry which can be used for the next batch of packets (or, in some embodiments, for the current batch of packets). Thus, subsequent packets that belong to the same data flow will not require a lookup in the datapath cache 263, but instead can be identified via the exact-match cache 253.

In certain cases, no matching flow entries can be found in the datapath cache (e.g., for the first packet of a data flow that does not share enough characteristics with other data flows). In these cases, the MFE shifts control of the packet processing to the MFE Daemon 265 for a full set of packet processing operations (i.e., executing of numerous lookup stages over the flow tables 275, which is more computationally expensive). One primary distinction between the cache 263 and the set of flow tables 275 is that there is at most only one matching flow entry for a packet in the cache 263. The cached flow entries specify all of the actions to take in order to process the packet, whereas each of the flow entries in the tables 275 only specify the actions for that stage, often specifying a resubmit action for processing by the next packet processing stage.

After completing the processing (i.e., identifying the groups and specified sets of actions) for the packets in a batch, the classifier 257 sends the packets in groups (for each data flow) to the action processor 259. The action processor 259 performs the set of actions specified for the packets, and executes these actions on all of the packets of the group together. For instance, for an array listing thirty packets, the action processor 259 passes the array of packets with one function call, rather than thirty separate function calls. This saves computational resources, especially on output actions by minimizing the I/O transactions.

The MFE daemon 265 of some embodiments includes a datapath flow generator 270. The datapath flow generator 270 is a component of the MFE that makes forwarding and other packet processing decisions. For any packet that is not matched in the datapath cache 263 (e.g., because the packet is the first in a new transport-layer connection), the datapath flow generator 270 performs the one or more flow table lookups required to process the packet, and then generates a new flow entry to install in the cache 263. In some embodiments, the datapath flow generator includes or works in conjunction with a separate classifier (not shown) in order to find one or more matching flow entries in the flow tables 275. Unlike the classifier 257, the MFE daemon 265 may perform one or more resubmits (i.e., be resubmitted back to the classifier with packet data modified based on actions performed by previous matched flow entries).

It should be understood that the architecture shown in FIG. 2 is an example architecture and that different embodiments can include different sets of components. The naming of the various components is arbitrary and can change from one implementation to another. Also, the architecture shows two different layers (e.g., the kernel layer and the user space layer) performing various operations. In some embodiments, these operations occur at just one layer (e.g., at the user space layer) or are further split into other layers.

II. Batched Packet Processing

As described above, some embodiments process packets in batches and execute actions on all packets in a batch that belong to the same data flow at once. The MFE of some embodiments receives a batch of packets to process together, and identifies groups of packets in the batch that belong to the same data flow (or belong to data flows that are processed in the same manner by the MFE). In general, the forwarding element will perform the same set of actions on all packets in the same data flow. As such, the forwarding element executes the action specified for the data flow on all of the packets in that data flow together (i.e., after determining the packets in the batch that belong to that data flow).

Figure 3:
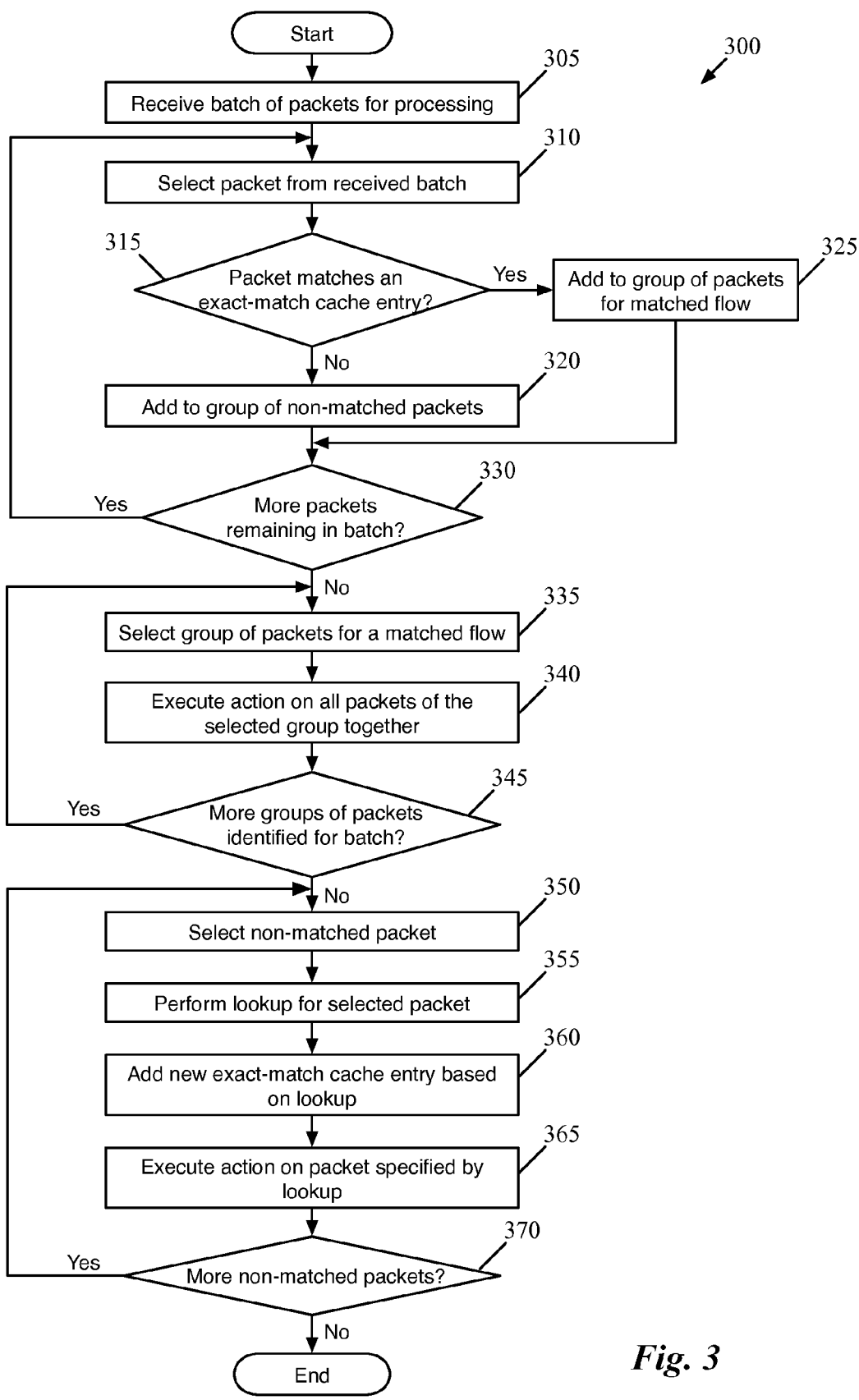
FIG. 3 conceptually illustrates a process 300 of some embodiments for grouping packets within a batch of packets according to the flow entries that the packet matches, and subsequently executing actions on each group of packets together.

FIG. 3 conceptually illustrates a process 300 of some embodiments for grouping packets within a batch of packets according to the flow entries that the packet matches, and subsequently executing actions on each group of packets together. The process 300, in some embodiments, is performed by a managed forwarding element (e.g., the MFE of FIG. 2 described above). In some embodiments, the datapath of the MFE performs the process 300, which may take place in the kernel or the user space of the virtualization software in different embodiments. In some embodiments, the process 300 is performed by an MFE repeatedly, for each subsequent batch of packets received by the MFE.

As shown, the process 300 begins (at 305) by receiving a batch of packets for processing by the MFE. In some embodiments, the number of packets in a batch is determined by a data processing software library used by the MFE (e.g., that define how the drivers of the machine on which the MFE operates interact with the NICs on the machine), such as dpdk. For instance, the number of packets in a batch might be 64, 100, 128, etc. The MFE may have received these packets from a VM or other data compute node (e.g., an application operating within a namespace or other container, etc.) operating on the same physical device as the MFE, or through a physical connection to a network (e.g., through a tunnel from another MFE, from a gateway that connects to external networks, etc.). The MFE of some embodiments stores the packets in a queue, or buffer, and releases the packets to its packet processing engine (e.g., the classifier) in the order they are received.

The process 300 then selects (at 310) a packet from the received batch. Some embodiments select the packets in order based on when they were received by the MFE, while other embodiments may select the packets in a different manner (e.g., randomly within the batch). In some embodiments, each packet is also received with a hash value (e.g., a RSS hash) generated for the packet by a NIC that received the packet (e.g., a physical NIC for packets received from external sources, or a VNIC for packets received from a VM or other data compute node operating on the same machine as the MFE). In some embodiments, the MFE also extracts the headers of the selected packet upon receipt. Some embodiments use a parser to extract these headers from the packet, and create a packet object to send to the classifier of the MFE. Some embodiments only extract certain header values required for the lookups (e.g., the five packet header values that define a data flow). The packet extraction of some embodiments is described in further detail in U.S. patent application Ser. No. 14/539,551, filed Nov. 12, 2014 and now published as U.S. Patent 2016/0094460, which is incorporated herein by reference.

For the selected packet, the process determines (at 315) whether the packet matches an exact-match cache entry. In some embodiments, each time the MFE receives the first packet of a data flow, the MFE generates an exact-match cache entry based on the flow entry matched by that first packet. The exact-match cache entry, in some embodiments, contains a flow key (i.e., a set of characteristics that uniquely identifies the data flow) and a reference to the matched flow entry. The matched flow entry, in some embodiments, is a traffic aggregate flow entry (also referred to as a megaflow) that specifies a set of actions to perform on packets of its traffic aggregate class (i.e., a set of data flows that share a particular set of characteristics). Some embodiments, in order to identify an exact-match cache entry, use the hash value received from the NIC to find a match. If the hash value for the packet matches that of an exact-match cache entry, the MFE checks the packet headers against those of the cache entry to ensure that the matching hash is not the result of a hash collision.

When the packet does not match one of the exact-match cache entries, the process 300 adds (at 320) the packet to a group of non-matched packets. Some embodiments store a group of all packets in a current batch that do not match a data flow for which an exact-match entry has already been generated, then perform lookups for these packets (in either the traffic aggregate cache or a full set of staged lookup tables) after batch processing is complete (operations 350-365 described below).

When an exact-match cache entry is found for the current packet, the process adds (at 325) the packet to a group of packets for the flow entry referenced by the matched exact-match entry. For each group of packets in a batch, the MFE of some embodiments stores a list (e.g., an array structure). Each entry in the list is a packet (or a reference to a packet) that matches an exact-match entry that references the same flow entry. Thus, for example, a list might have packets from multiple different data flows, for which the exact-match entries point to the same flow entry. When a packet is found that matches an exact-match cache entry, the MFE uses the flow entry reference (e.g., flow pointer) in the exact-match entry to determine whether a group already exists for the referenced flow entry. When a group exists, the MFE adds the packet to the list for that group. When a group does not yet exist for the referenced flow entry, the MFE creates a new group for the flow entry using the flow reference, and adds the packet as the first packet in the list for the new group. In addition, some embodiments have a limit to the number of groups that can have active lists at one time (e.g., a limit of four). When the new group would push the number of active lists beyond the limit, the MFE of such embodiments executes the packets in one of the existing groups when creating the new group. Often, a batch will have numerous packets from the same data flow, so this maximum number is not an issue. For example, if a VM that operates on the host with the MFE is acting as a web server, it may send out hundreds or thousands of packets at once in response to receiving an http request, and many of these packets will be grouped together in a single batch.

The process 300 then determines (at 330) whether additional packets are remaining in the batch (of, e.g., 64 packets). When additional packets remain, the process returns to 310 to select the next packet. Packets placed in the non-matched group of packets are processed later, in some embodiments. After running all of the packets in the batch through the exact-match cache, the process next performs operations to execute all of the packets that matched an exact-match entry.

Specifically, the process selects (at 335) one of the groups of packets for a particular one of the flow entries (i.e., a list of packets that references the particular flow entry). Some embodiments choose the groups in the order in which the first packet of each group was received. Other embodiments order the groups based on the number of packets assigned to each group, when the last packet in the group was received, or using other criteria.

The process then executes (at 340) the specified set of actions on all packets of the selected group together. That is, because all of the packets in the particular data flow will receive the same particular set of actions, the action processor of the MFE need only call these actions once for all of the packets at the same time, thereby saving computational resources. Rather than passing a single packet numerous times for numerous separate function calls, the MFE instead calls each action once, passing the array of packets with the call. The set of actions may include dropping the packets, packet header transformations, outputting the packets to a particular port, etc. For instance, all of the packets in a particular data flow might be routed in the same way to receive the same source and destination MAC addresses, encapsulated in the same tunnel, and then output to the same physical port of the MFE.

After executing the set of actions for a particular group of related data flows, the process 300 determines (at 345) whether any more groups of packets remain for the current batch, that have not had their respective sets of actions executed yet. When additional groups remain, the process returns to 335 to select the next group of packets for a different flow entry, and execute the specified actions for those packets.

Once all of the groups (and therefore all of the packets) of the batch have been processed and had their actions executed, the process moves onto processing the group of non-matched packets. While shown as a linear flow, it should be recognized that in some embodiments the MFE may execute actions on the groups of matched packets while at the same time processing the unmatched packets (i.e., the MFE need not wait until after all the groups of matched packets have had their actions executed in order to begin performing the flow lookups for the non-matched packets).

To process the non-matched packets, the MFE selects (at 350) one of the non-matched packets. For the initial batches after a host with the MFE is powered on or a new VM is instantiated on the host, a large number of packets may not yet have exact-match entries. However, once the cache is built up, fewer packets will fall into the non-matched group.

The process 300 performs (at 355) a lookup in the flow tables to find a matching flow entry for the packet and identify the set of actions to perform on the packet (and any other subsequent packets that belong to the same data flow). The MFE of some embodiments initially performs a lookup in the aggregate cache to identify a flow entry for the packet. In some cases, however, if the packet does not belong to a traffic aggregate for which a data flow has previously been seen, the MFE performs a full set of lookups in the user space staged packet processing pipeline tables.

Upon finding a matching flow entry (or completing the staged set of tables), the process 300 creates (at 360) a new exact-match cache entry based on the lookup. As mentioned above, the exact-match cache entries of some embodiments contain the set of packet headers that identify the data flow (i.e., the headers of the currently selected packet for which the entry is generated) and a reference to the matched flow entry. In some embodiments, when a packet requires processing through the full set of forwarding tables, the MFE only generates an aggregate cache flow entry. The next packet in the data flow will then match the aggregate cache flow entry, and the MFE then generates an exact-match cache entry that references the cached flow entry.

Having identified the operations to perform on the currently selected packet, the process 300 executes (at 365) on the packet the actions specified by the lookup. As described above, the set of actions applied to a packet may include dropping the packets, packet header transformations, outputting the packets to a particular port, etc. For instance, all of the packets in a particular data flow might be routed in the same way to receive the same source and destination MAC addresses, encapsulated in the same tunnel, and then output to the same physical port of the MFE. For these packets that do not belong to a flow group, some embodiments execute the actions on each packet individually.

Finally, the process determines (at 370) whether any non-matched packets remain. If additional such packets have not been processed through the datapath by the MFE, the process returns to 350 to select the next packet. When all of the matched packets and non-matched packets have been processed, the process ends (although in many cases, a new batch of packets will be released to the MFE for processing.

Figure 4:
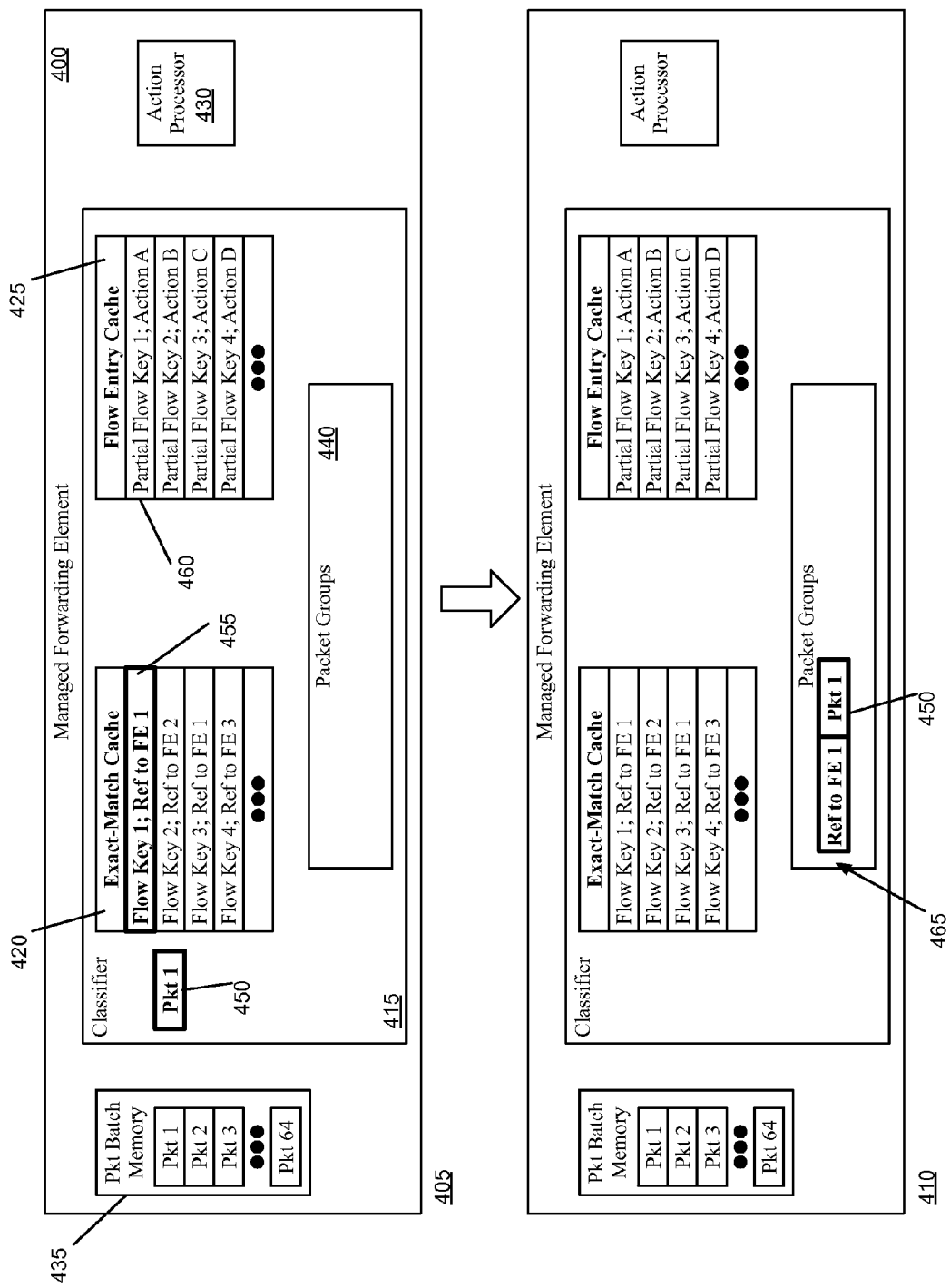
FIG. 4 illustrates the processing by an MFE of the first packet of a batch.

FIGS. 4-9 illustrate examples of an MFE 400 processing packets within a batch of packets. These figures illustrate the processing for the first packet in a data flow within a batch, subsequent packets within a data flow, packets for additional data flows, as well as the completion of a batch. FIG. 4, specifically, illustrates the processing by the MFE 400 of the first packet of a batch over two stages 405-410.

The MFE 400 includes a classifier 415, including an exact-match cache 420 and a flow entry cache 425, as well as an action processor 430. These figures, as well as FIG. 2 above, illustrate the exact-match cache as part of the classifier, though in other embodiments, the exact-match cache and the operations to match packets against it are separate from the classifier (e.g., a separate part of the datapath).

The classifier 415 of some embodiments handles the packet classification (i.e., identifying the actions to perform on the packets. Thus, the classifier includes the flow entry cache 425, for specifying actions to perform on packets that match specific sets of packet headers (though not necessarily the entire set of headers, and thus referred to in the figure as partial flow keys). The partial flow keys for different flow entries in the cache 425 may have different sets of packet headers in some embodiments, depending on the packet headers used to match entries in the full staged lookup tables from which the flow entries in the cache 425 were generated.

The exact-match cache 420, as described above, includes full flow keys (i.e., a full set of packet headers) and references to the flow entries in the flow entry cache 425. Because multiple different data flows that share the packet headers in a partial flow key may all match a single flow entry in the cache 425, the exact-match cache may include multiple entries that reference the same flow entry in the cache 425. As described, the classifier 415 uses the exact-match cache to group packets for processing by the action processor. The classifier also stores (e.g., in memory) a set of packet groups 440.

The action processor 430 is responsible for executing the actions specified by the flow entries 440 on the packets processed by the MFE (e.g., as described above for the action processor 259). The MFE 400 also includes a packet batch memory structure 435, which is representative of the batches of packets (e.g., packet objects) stored by the MFE for processing. In this example, the batches each have 64 packets, as shown. This specification often refers to packets and packet headers, as with the packets in the batch memory structure 435. The term "packet" is used here as well as throughout this application to refer to a collection of bits in a particular format sent across a network. It should be understood that the term packet may be used herein to refer to various formatted collections of bits that may be sent across a network, such as Ethernet frames, TCP segments, UDP datagrams, IP packets, etc.

The first stage 405 illustrates the initial processing of the first packet 450 of the batch of packets by the classifier 415. Specifically, the classifier receives the first packet 450 (or the set of extracted header values of the packet) and compares the header values of the packet to the values for the previously-identified flows stored in the exact-match cache 420. As described, in some embodiments, the classifier generates (or receives) a hash of the packet headers (e.g., the RSS hash generated by the NIC), and uses this hash to determine whether a match can be found. In this case, the packet headers match the first exact-match cache entry 455, which includes a reference to the first flow entry 460 (specifying Action A for matching packets).

The second stage 410 illustrates that, rather than immediately executing Action A on the packet 450, the MFE 400 creates a new packet group 465, and adds the packet 450 to this group. In some embodiments, this group is an array or other data structure, and stores (i) a reference to the a particular flow entry (in this case, the flow entry 460) in the flow entry cache 425 as well as (ii) a list of packets that will be executed according to the actions specified by the flow entry. Some embodiments store references (e.g., pointers) to the packet objects in the packet batch memory in the packet group arrays.

Figure 5:
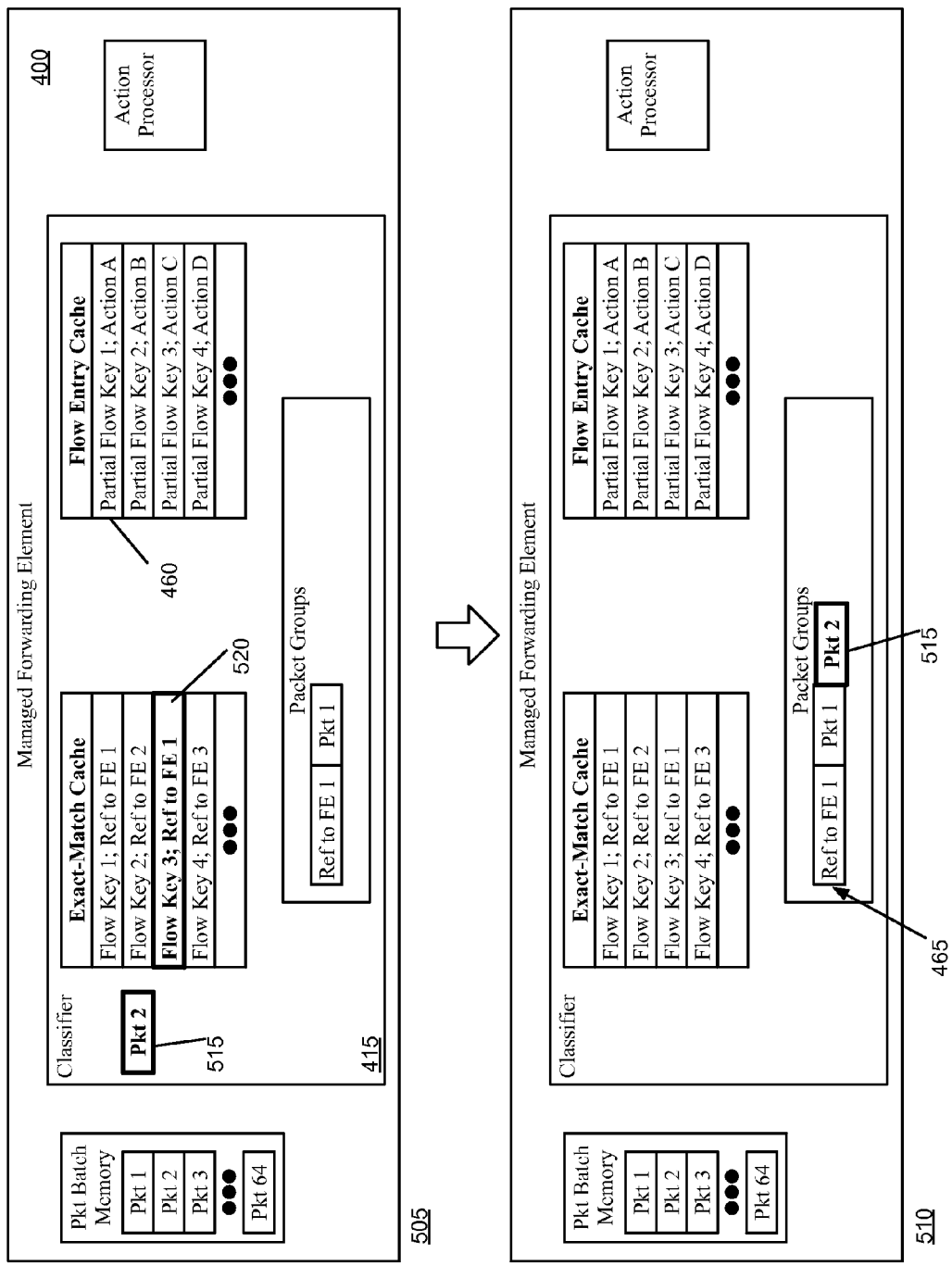
FIG. 5 illustrates the processing of a second packet of the batch by the MFE of FIG. 4.

FIG. 5 illustrates the processing of a second packet 515 by the MFE 400, over two stages 505-510. As shown, the first stage 505 illustrates that initially the classifier 415 compares the packet (or the set of extracted header values of the packet) to the exact-match cache entries (e.g., using a hash value of the packet headers). In this case, the packet matches the exact-match entry 520, which includes a reference to the first flow entry 460 (specifying Action A for matching packets).

The second stage 510 illustrates that the MFE 400 adds the packet 515 to the previously-created group 465. Even though the second packet 515 matched a different exact-match cache entry than that matched by the first packet 450 (and thus belongs to a different data flow), both of these exact-match cache entries reference the same cached flow entry 460, and the MFE is instructed to perform the same action on the packets of both data flows. Thus, because the packet groups are organized by the references to the flow entries, the classifier 415 identifies to place the second packet 515 in the same group 465 as the first packet, by matching the flow entry reference from the exact-match entry 520 to the flow entry reference for the group 465.

Figure 6:
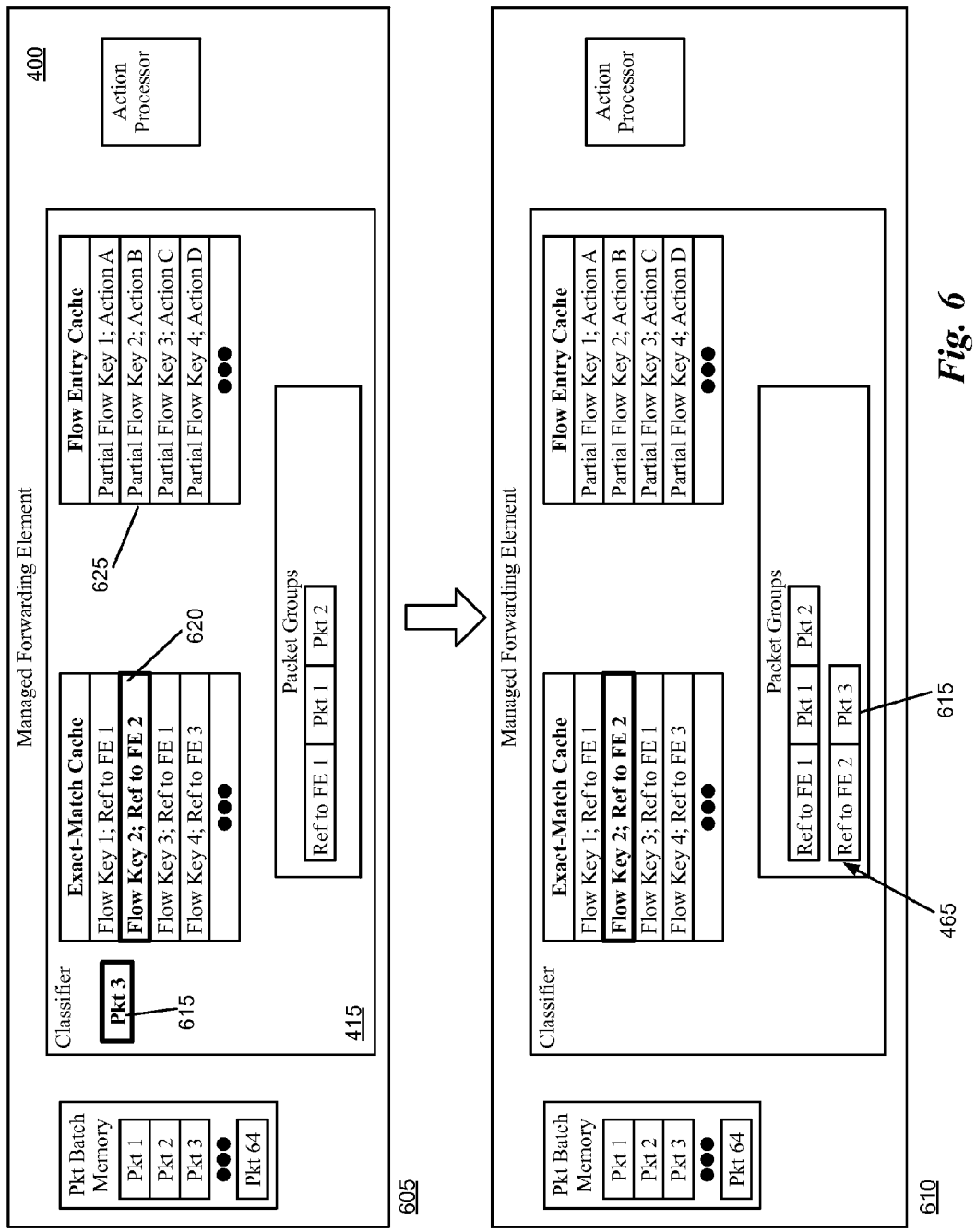
FIG. 6 illustrates the processing of a third packet of the batch by the MFE of FIG. 4.

FIG. 6 illustrates the processing of a third packet 615 by the MFE 400, over two stages 605-610. In the first stage 605, the classifier 415 receives the packet 615 (or the set of extracted header values of the packet), and compares the header values of the packet to the values for the previously-identified flows stored in the exact-match cache 420 (e.g., using a hash of the packet headers). In this case, the packet matches the exact-match entry 620, which includes a reference to the flow entry 625 in the flow entry cache 425. This flow entry specifies Action B for matching packets).

The second stage 610 illustrates that the MFE 400 creates a new packet group 630 and adds the packet 615 to this new group. As with the first group 465, the new group 630 is an array or other data structure, and stores (i) a reference to the flow entry 625 in the flow entry cache as well as (ii) a list of packets (e.g., as references to the packets stored in the indices of the array) that will be executed according to the actions specified by the flow entry. Subsequent packets that match one of the exact-match entries can then be added to one of these two groups, or to a new group if additional exact-match entries referring to different flow entries are matched by subsequent packets.

Figure 7:
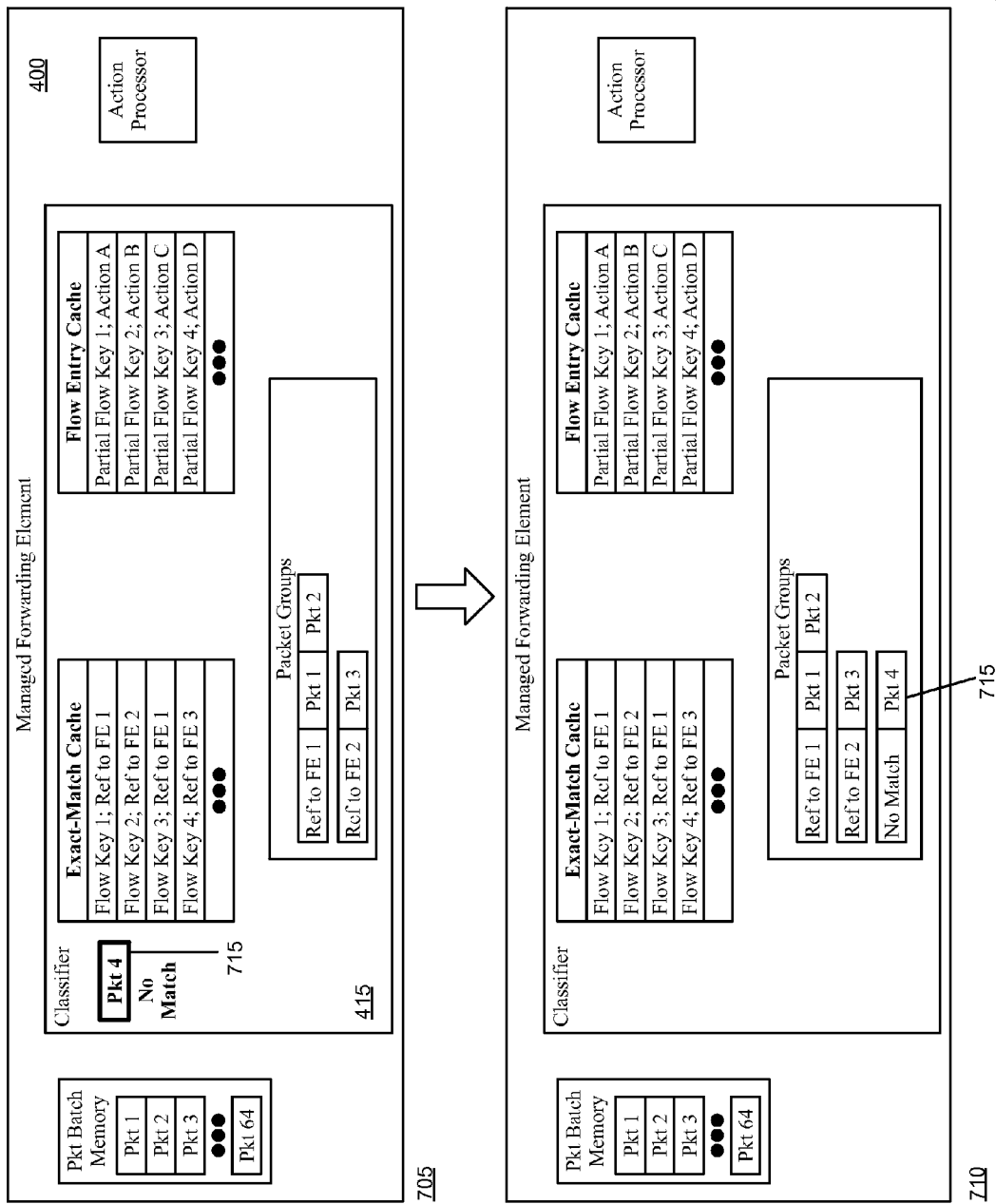
FIG. 7 illustrates the processing of a packet that does not match an exact-match entry by the MFE of FIG. 4.

FIG. 7 illustrates the processing of a fourth packet 715 by the MFE 400, over two stages 705-710. In the first stage 705, the classifier 415 again receives the packet 715 (or the set of extracted header values of the packet), and compares the header values of the packet to the previously-identified flows stored in the exact-match cache 420 (e.g., using a hash of the packet headers). In this case, however, the packet does not match any of the exact-match entries (e.g., because it is the first packet in a new data flow).

As such, in the second stage 710, the MFE 400 adds the packet 715 to a new, non-matched group 7. As described above, some embodiments place all the packets that do not match an exact-match entry in a separate group and process these packets last, after the execution of actions on the groups of packets in the batch. The processing of these packets results in the generation of additional new exact-match entries.

Figure 8A:
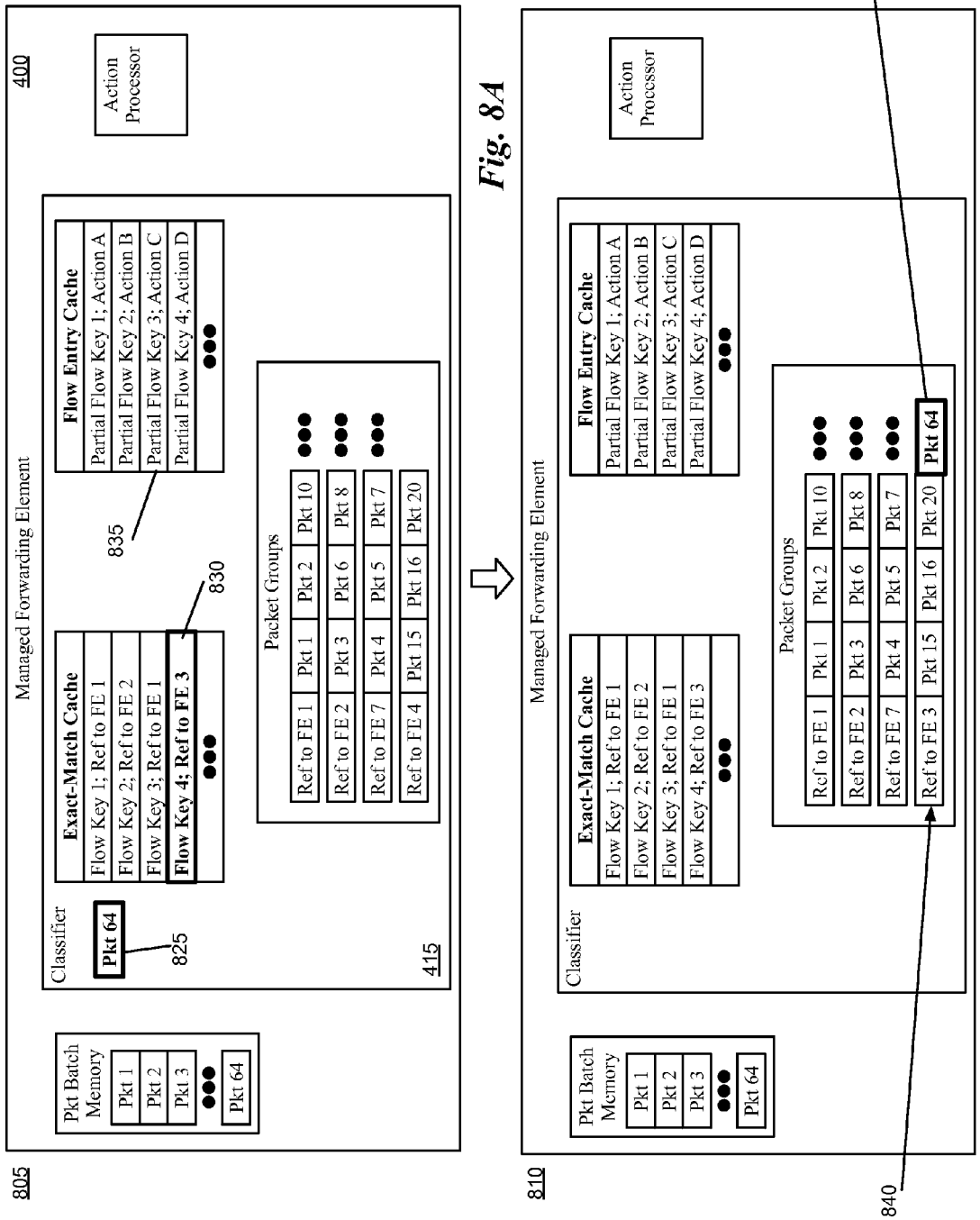
FIGS. 8A-B illustrate the actions of the MFE of FIG. 4 after all of the packets in a batch have been assigned to different groups of flows.
Figure 8B:
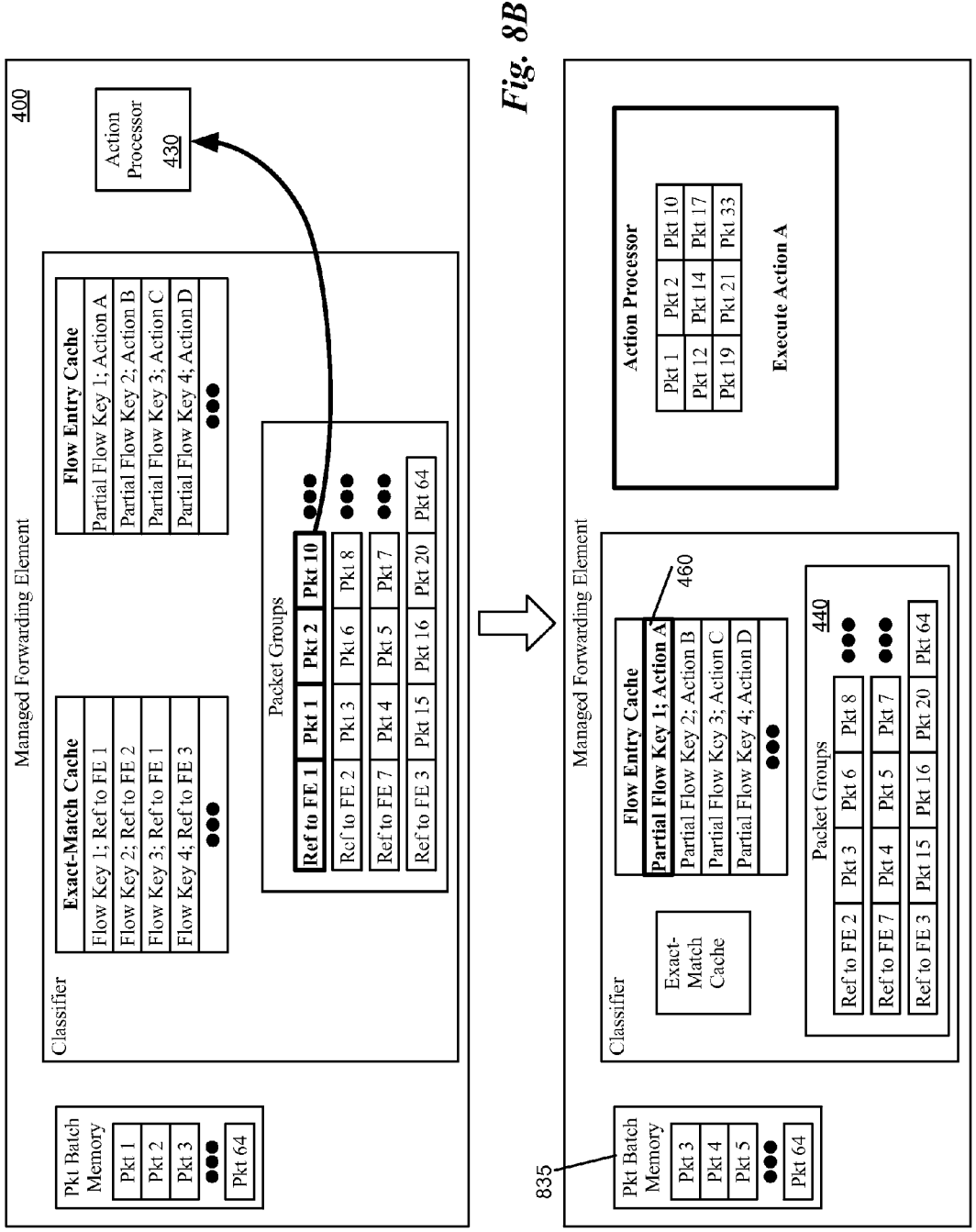

FIGS. 8A-B illustrate the actions of the MFE 400 after all of the packets in a batch have been assigned to different groups of flows, over four stages 805-820. The first stage 805 illustrates that the last (64$^{th}$) packet 825 (or the set of extracted packet headers) in the batch is received by the classifier 415, and compared to the exact-match cache entries. In this case, the packet 825 matches the exact-match entry 830, wherein includes a reference to the third flow entry 835. In the second stage 810, the MFE 400 adds the packet 825 to a group 840 that references this third flow entry 835, as the fourth packet in this group.

The third stage 815 illustrates that, now that all of the packets in the batch have been compared to the exact-match cache and placed into groups (in this example, none of the packets fall into the non-matched group), the MFE 400 begins executing actions on the packets. As shown, in this example, the MFE 400 sends all of the packets from one of the groups to the action processor 430. Specifically, the MFE 400 sends all of the packets belonging to the first group 465 (referencing the first flow entry 460) to the action processor 430.

The fourth stage 820 shows the action processor executing the set of actions Action A on the nine packets from the batch that were identified as belonging to data flows that match the flow entry 460. Because the packet group is organized according to a reference to this flow entry, the action processor identifies that to use this flow entry in order to process the packets. The action processor 430 executes the set of actions on all of the packets together (by calling a function for the action, and passing the array of packets to the function rather than a single packet per function call), thereby saving computational resources. In addition, the packet group 465 is removed from the set of packet groups 440, and the packets of this group are now removed from the packet batch memory 435. The MFE 400 would then subsequently send each of the other three groups of packets to the action processor 430 and remove the packets from the batch memory 435. This leaves both the packet batch memory structure 435 and the batch groups memory 440 empty, and thus prepared for the next batch of packets for processing.

Figure 9A:
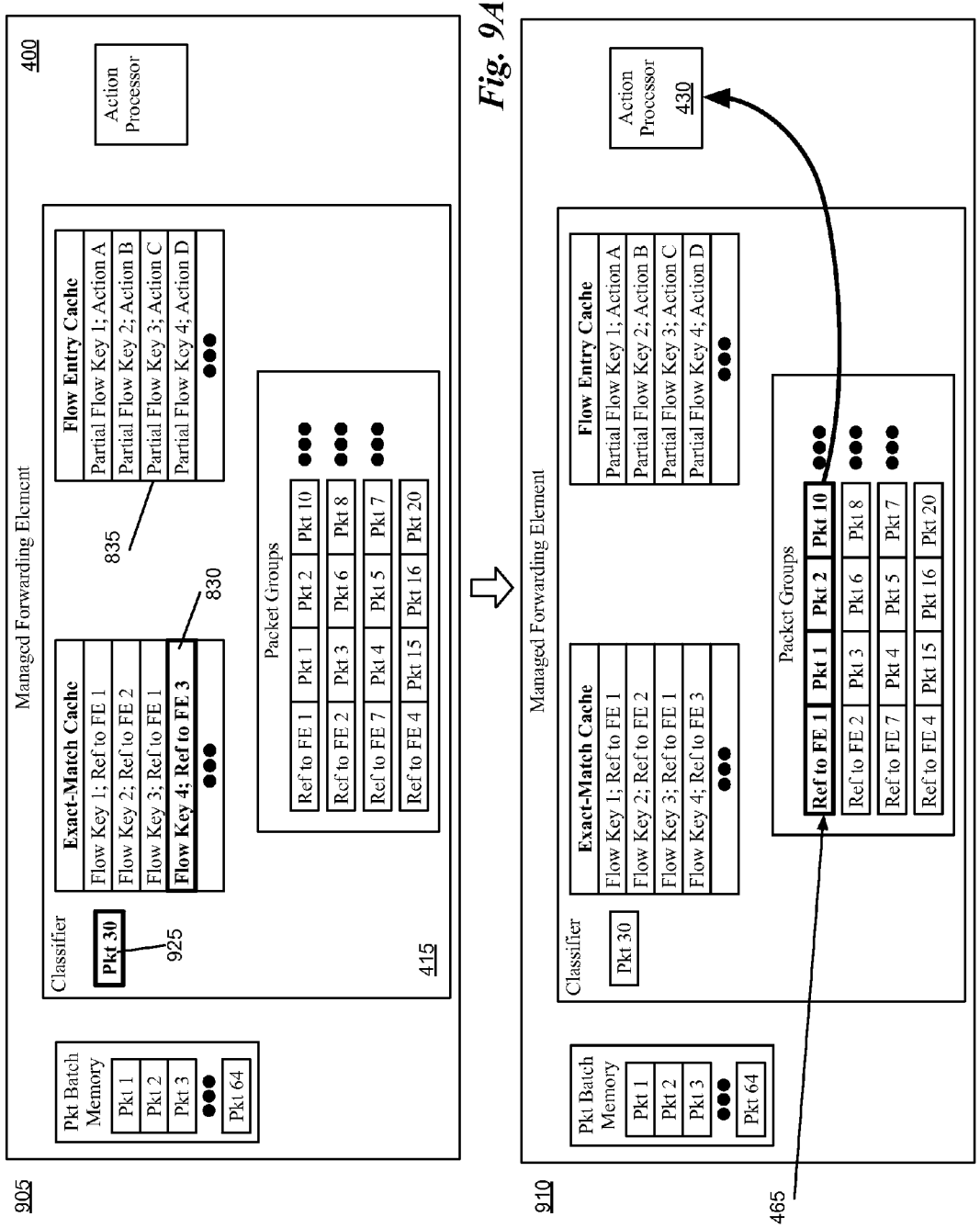
FIGS. 9A-B illustrate an example of the MFE of FIG. 4 handling a packet for a fifth packet group.
Figure 9B:
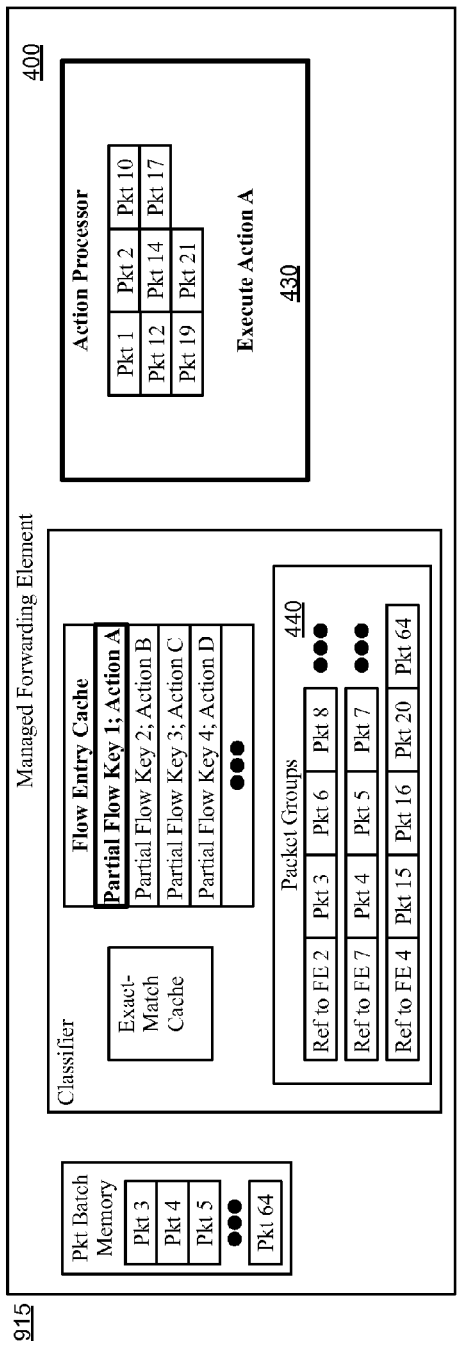
Figure 9B:
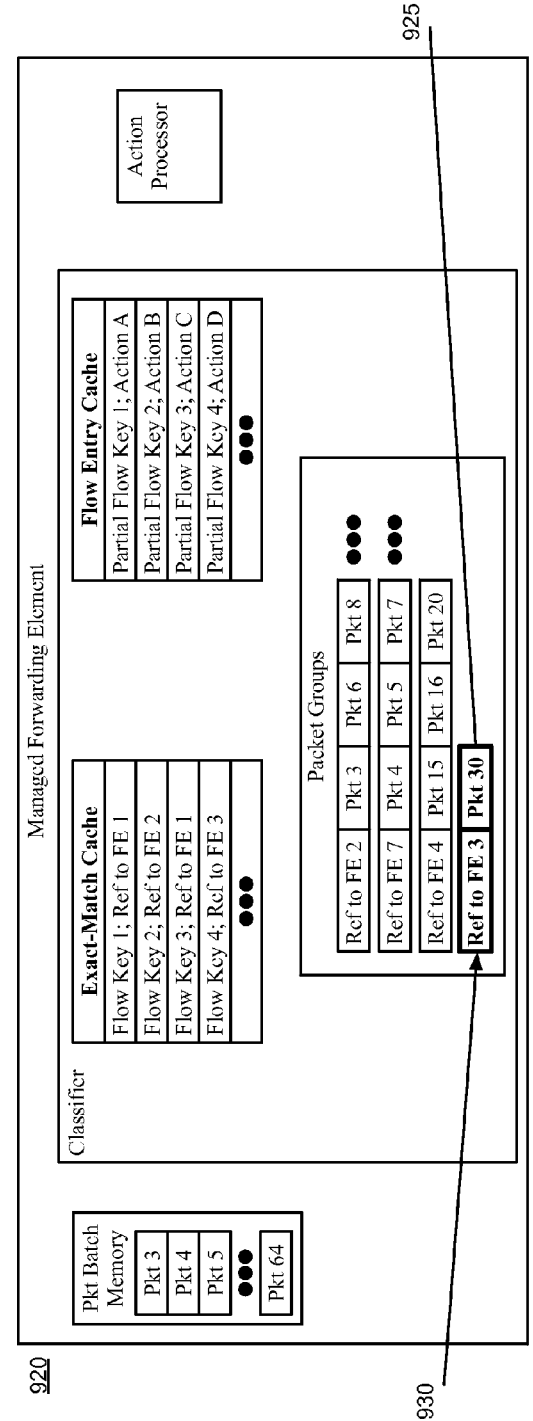

In the example of FIG. 8, only four packet groups were present in the batch of 64 packets. However, in some cases, the MFE only allows a certain number of such groups, and this limit (e.g., four) might be smaller than the number of groups present in the batch (i.e., the number of matching flow entries for packets in the batch). FIGS. 9A-B illustrate an example of the MFE 400 handling a packet for a fifth packet group, over four stages 905-920. In the first stage 905, the packet groups memory 440 already stores four group arrays. At this point, a packet 925 (the 30$^{th}$ packet in the batch) is being processed by the classifier 415 and compared to the exact-match cache entries. The packet 925 is found to match the exact-match entry 830, which refers to the cached flow entry 835. The cached flow entry 835 is not referred to by any of the four existing packet groups, so the packet 925 needs to be placed in a new group.

However, there are already four groups of packets, the maximum number of groups allowed for a batch. as such, at the second stage 910, the MFE sends the packets in the first group 465 to the action processor 430. In the third stage 915, the action processor 430 executes the set of actions Action A on the eight packets of the group 465. Because the packet group is organized according to a reference to the flow entry 460, the action processor identifies to execute the set of actions specified by this flow entry. As in the previous figure, the action processor 430 executes the set of actions on all eight of the packets together by, e.g., calling a function for the action and passing the array of packets as a parameter. Especially for I/O transactions with the NIC (e.g., to transmit packets out a physical port of the MFE), this saves resources significantly. In addition, the group 465 is removed from the set of packet groups 440, and the packets of this group are now removed from the packet batch memory 435. Removing the packet group 465 frees up space in the packet group memory 440 for a fourth group. As such, in the fourth stage 920 the MFE 400 creates a new packet group 930 and adds the packet 925 to this group.

The above examples all use packet groups that reference a single flow entry. As such, it is possible for multiple packet groups to result in the same or similar actions. For example, multiple different cached flow entries might specify to output the packet to a particular port with a particular tunnel encapsulation. As another example, decrementing the time-to-live (TTL) field by a particular number (e.g., 1 or 2, depending on the number of logical routers through which the packet is logically processed by the MFE) may be performed on packets of different data flows, which may have different TTL values. However, the action to decrement this field by a particular amount is the same across the different flows, and thus can be executed on packets of several different flows together.

III. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 10:
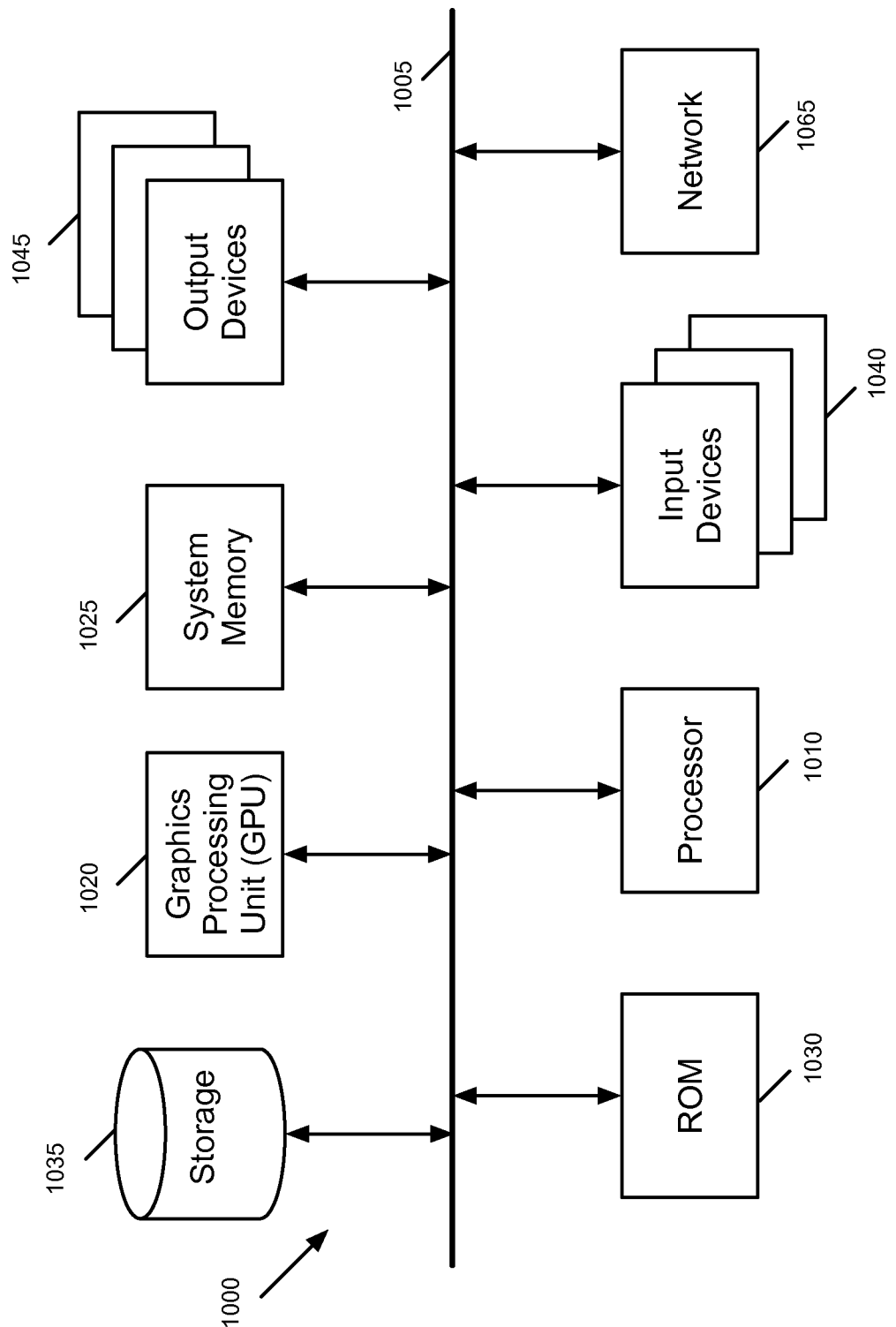
FIG. 10 conceptually illustrates an electronic system with which some embodiments of the invention are implemented.

FIG. 10 conceptually illustrates an electronic system 1000 with which some embodiments of the invention are implemented. The electronic system 1000 can be used to execute any of the control, virtualization, or operating system applications described above. The electronic system 1000 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1000 includes a bus 1005, processing unit(s) 1010, a system memory 1025, a read-only memory 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1030, the system memory 1025, and the permanent storage device 1035.

From these various memory units, the processing unit(s) 1010 retrieve instructions to execute and data to process in order to execute the processes of the invention. The processing unit(s) may be a single processor or a multi-core processor in different embodiments.

The read-only-memory (ROM) 1030 stores static data and instructions that are needed by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1035.

Other embodiments use a removable storage device (such as a floppy disk, flash drive, etc.) as the permanent storage device. Like the permanent storage device 1035, the system memory 1025 is a read-and-write memory device. However, unlike storage device 1035, the system memory is a volatile read-and-write memory, such a random access memory. The system memory stores some of the instructions and data that the processor needs at runtime. In some embodiments, the invention's processes are stored in the system memory 1025, the permanent storage device 1035, and/or the read-only memory 1030. From these various memory units, the processing unit(s) 1010 retrieve instructions to execute and data to process in order to execute the processes of some embodiments.

The bus 1005 also connects to the input and output devices 1040 and 1045. The input devices enable the user to communicate information and select commands to the electronic system. The input devices 1040 include alphanumeric keyboards and pointing devices (also called "cursor control devices"). The output devices 1045 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 10, bus 1005 also couples electronic system 1000 to a network 1065 through a network adapter (not shown). In this manner, the computer can be a part of a network of computers (such as a local area network ("LAN"), a wide area network ("WAN"), or an Intranet, or a network of networks, such as the Internet. Any or all components of electronic system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, it should be understood that the invention can be embodied in other specific forms without departing from the spirit of the invention. In addition, a number of the figures (including FIG. 3) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, it should be understood that the invention is not to be limited by the foregoing illustrative details, but rather is to be defined by the appended claims.

The invention claimed is:

1. For a managed forwarding element that receives and processes a set of packets, a method comprising:
for each of a plurality of packets in the set, using entries in a cache to associate the packet with one of several groups of other packets in the set, each group of packets sharing a set of characteristics, and each entry in the cache comprising a set of packet header values and a reference to a flow entry,
said using the entries for a packet comprising:
comparing a set of header values of the packet against one or more sets of header values of one or more entries in the cache to determine whether the packet matches any entry in the cache;
when the packet matches an entry in the cache, associating the packet with a group according to the referenced flow entry; and
when the packet does not match any entry in the cache, associating the packet with a group of unmatched packets;
for each group of packets, identifying a set of actions to perform from the referenced flow entry; and
for each group of packets, executing the specified set of actions on all of the packets in the group together.

2. The method of claim 1, wherein the managed forwarding element is a software forwarding element, wherein a size of the set of packets is determined by a packet processing software library utilized by the managed forwarding element.

3. The method of claim 1, wherein the set of characteristics is a particular set of packet header values that affects the actions performed on the packet by the managed forwarding element.

4. The method of claim 1, wherein the set of actions for a particular group comprises dropping the packets associated with the particular group.

5. The method of claim 1, wherein the set of actions for a particular group comprises modifying one or more packet header values in a particular manner.

6. The method of claim 1, wherein the set of actions for a particular group comprises outputting the packet to a particular port.

7. The method of claim 1, wherein a particular group of packets comprises packets from several different data flows.

8. The method of claim 1, wherein associating a particular packet with a group comprises adding the particular packet to a group of packets that match entries in the cache that comprise references to a same particular flow entry as the entry in the cache matched by the particular packet.

9. The method of claim 1, wherein the cache of entries is a first cache and the flow entry is one of a plurality of flow entries in a second cache of flow entries, the method further comprising performing a lookup in the second cache of flow entries for each packet in the group of unmatched packets.

10. The method of claim 1, wherein executing the set of actions on all of the packets in a group together comprises passing an array of packets to a function for a particular action in the set of actions.

11. A machine readable medium storing a managed forwarding element for execution by at least one processing unit to receive and process a set of packets, the managed forwarding element comprising sets of instructions for:
for each of a plurality of packets in the set, using entries in a first cache to associate the packet with one of several groups of other packets in the set, each group of packets sharing a set of characteristics, and each entry in the first cache comprising a set of packet header values,
said using the entries for a packet comprising:
comparing a set of header values of the packet against one or more sets of header values of one or more entries in the first cache to determine whether the packet matches any entry in the first cache;
when the packet matches an entry in the first cache, associating the packet with a group; and
when the packet does not match any entry in the first cache, associating the packet with a group of unmatched packets; and
performing a lookup in a second cache of flow entries for each packet in the group of unmatched packets.

12. The machine readable medium of claim 11, wherein the set of characteristics is a particular set of packet header values that affects the actions performed on the packet by the managed forwarding element.

13. The machine readable medium of claim 11, wherein each entry in the first cache further comprises a reference to a flow entry in the second cache of flow entries.

14. The machine readable medium of claim 13, wherein the set of instructions for associating a particular packet with a group comprises a set of instructions for adding the particular packet to a group of packets that match entries in the first cache that comprise references to a same particular flow entry in the second cache as the entry in the first cache matched by the particular packet.

15. The machine readable medium of claim 13, wherein each flow entry in the second cache of flow entries specifies a set of actions to perform on a packet, wherein identifying the set of actions to perform on a particular packet comprises identifying the set of actions specified by a referenced flow entry.

16. A machine readable medium storing a managed forwarding element for execution by at least one processing unit to receive and process a set of packets, the managed forwarding element comprising sets of instructions for:
for each of a plurality of packets in the set, using entries in a cache to associate the packet with one of several groups of other packets in the set, each group of packets sharing a set of characteristics, and each entry in the cache comprising a set of packet header values and a reference to a flow entry, said using the entries for a packet comprising:
- comparing a set of header values of the packet against one or more sets of header values of one or more entries in the cache to determine whether the packet matches any entry in the cache;
- when the packet matches an entry in the cache, associating the packet with a group according to the referenced flow entry; and
- when the packet does not match any entry in the cache, associating the packet with a group of unmatched packets;

for each group of packets, identifying a set of actions to perform from the referenced flow entry; and for each group of packets, executing the specified set of actions on all of the packets in the group together.

17. The machine readable medium of claim 16, wherein the set of actions for a particular group comprises at least one of (i) dropping the packets associated with the particular group, (ii) modifying one or more packet header values in a particular manner, and (iii) outputting the packets to a particular port.

18. The machine readable medium of claim 16, wherein each entry in the cache matches with a corresponding data flow, wherein the referenced flow entry matches with a plurality of different data flows.

19. The machine readable medium of claim 16, wherein the set of instructions for executing the specified set of actions on all of the packets in a group together comprises a set of instructions for passing an array of packets to a function for a particular action in the set of actions.

20. The machine readable medium of claim 16, wherein the set of actions for a particular group comprises dropping the packets associated with the particular group.

21. The machine readable medium of claim 16, wherein the set of actions for a particular group comprises modifying one or more packet header values in a particular manner.

22. The machine readable medium of claim 16, wherein the set of actions for a particular group comprises outputting the packet to a particular port.

* * * * *